Dec. 7, 1954

W. M. WHEILDON, JR 2,696,413

BEARING

Filed July 25, 1951

Inventor
WILLIAM MAXWELL WHEILDON, JR

By George Compton
Attorney

United States Patent Office 2,696,413
Patented Dec. 7, 1954

2,696,413

BEARING

William Maxwell Wheildon, Jr., Framingham Centre, Mass., assignor to Norton Company, Worcester, Mass., a corporation of Massachusetts Application July 25, 1951, Serial No. 238,441

6 Claims. (Cl. 309—3)

The invention relates to a journal and a bearing therefor and also to a two component bearing where there is no journal. This application is a continuation in part of my copending application Serial No. 151,585 filed March 24, 1950 and now abandoned.

One object of the invention is to provide a journal and bearing the parts of which will maintain their dimensions during the long periods of operation. Another object of the invention is to provide a journal and bearing to meet unusual service conditions. Another object of the invention is to provide a journal and bearing which can run dry without failure. Another object of the invention is to provide a journal and bearing which will operate properly and without unreasonable wear with such unusual lubricants as water and steam. Another object of the invention is to provide a journal and bearing operable at high speeds and under high pressures. Another object of the invention is to provide a journal and bearing which will not deteriorate at high temperatures. Another object is to provide a journal and bearing of extremely long life in which the two elements thereof show little wear after long periods of operation with the usual lubricants such as various oils. Another object is to provide a journal and bearing which will not freeze even under heavy loads and at high speeds. Another object is to provide a journal and bearing which will not conduct electricity. Another object is to provide a two component bearing (involving no journal, such as in the case of flat bearings) having one or more of the above features and advantages. Another object is to provide a two component bearing, whether journal and bearing or involving flat bearings or any other species, the components of which are unusually resistant to acids and other corrosives including in this connection water, which rusts iron and many steels, whereby the two component bearing will not be affected by any liquids. Another object of the invention is to provide superior cylinders and piston rings for internal combustion engines.

Other objects will be in part obvious or in part pointed out hereinafter.

In the accompanying drawings illustrating some of the many possible embodiments of the invention:

Figure 1:
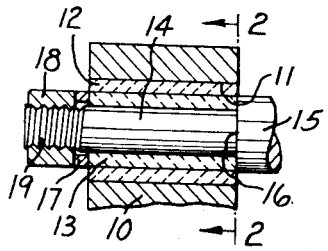
Figure 1 is an axial sectional view of a shaft having a journal piece thereon rotatably supported by a bearing.

According to the present invention one of the two components essentially consists of hard oxide material of which at least 60% by volume is selected from the group consisting of aluminum oxide, spinel (MgO·Al₂O₃), mullite (3Al₂O₃·2SiO₂) and zirconia and mixtures thereof, and the other of said components, for at least two thousandths of an inch in depth where said components are in contact is at least 25% by volume carbide selected from the group consisting of tungsten carbide, tantalum carbide, titanium carbide, zirconium carbide and vanadium carbide and mixtures thereof, and the remainder of said other component essentially consists of metal selected from the group consisting of steel, iron, cobalt and nickel and mixtures thereof, and each of said components has a smooth surface where it contacts the other one.

By aluminum oxide I mean a massive piece of finely crystalline aluminum oxide produced either by sintering or hot pressing alumina powder. For example, I may take an alumina powder produced by the Bayer process containing 99.5% alumina and ball mill this with iron balls until the particle size is in the neighborhood of 3 microns. I then wash this powder by decantation with dilute hydrochloric acid until it is comparatively free from the iron picked up from the iron balls and mill. I then wash with distilled water until the pH of the wash water is approximately 3. This gives me fine alumina that may be suspended in water and cast in plaster molds in the conventional manner followed by drying and firing to 1825° C. for a few minutes. At this temperature the alumina particles sinter together and the whole mass shrinks to a dense material with a specific gravity of about 3.7. This mass is very hard, strong and eminently suited as a bearing material.

In place of slip casting, I find it convenient to dry the alumina powder after washing and subsequently press it into desired shapes in a steel mold under pressures from 2 to 10 tons p. s. i. The powder may be slightly moistened with water or with an organic temporary binder for convenience in pressing. The article is stripped from the mold and fired as above.

This fine alumina produces excellent articles for bearing purposes, but I have found that it is unnecessary to use as high purity a product or to fire it at as high a temperature. For example, I can mix fairly pure alumina that has been ball milled to between 2 and 25 microns particle size with 10% of kaolin and a small amount of moisture to aid in molding as above and fire at a temperature of 1650° C. and obtain articles that are extremely durable as bearing members. Not only is clay a suitable addition agent but also calcium and magnesium compounds in quantities ranging up to 3% so that a final analysis of my article may be approximately as in the following table:

Table I

| | Per cent |
|---|---|
| Al₂O₃ | 88.8 |
| SiO₂ | 8.8 |
| MgO | 1.0 |
| CaO | 0.8 |
| Fe₂O₃ | 0.5 |
| Na₂O | 0.1 |

In this case the firing temperature would be approximately 1600° C.

In case clay is used in substantial quantity, an appreciable amount of mullite will appear in the finished article. It will be seen that by increasing the quantity of clay in proportion to the alumina, a gradual transition will occur in the finished article from substantially 100% alpha alumina to 100% mullite and I have found that all mixtures are useful for bearings, though for the more severe applications, the compositions with high alpha alumina are preferred.

It should be mentioned that another practical means of fabricating bearing products is by hot pressing the molding powder in a graphite mold at a pressure of roughly 2500 lbs. per square inch and a temperature between 1200 and 1700° C., the temperature being chosen to suit the particular composition.

If to the ball milled alumina above I had added magnesium oxide alone, the first effect would be to inhibit the grain growth of the aluminum oxide although the body would sinter together satisfactorily. Many experiments have shown that bodies containing from ½ to 1½% MgO and as a consequence sintering to much finer crystal structure are stronger and therefore more suitable for my purposes than when magnesia is absent. When the magnesium oxide content reaches approximately 1½%, micro crystals of magnesium spinel are observable in the fired product. As the amount of MgO is increased above this point, the volume of spinel crystals in the mass increases very rapidly until the whole structure is converted to spinel at an MgO content of 10%, although the stoichiometric proportion of MgO in magnesium spinel is 28%. The explanation is that at a high temperature of firing, such as cone 35, alpha alumina is soluble in magnesium spinel to such an extent that although the crystal structure has not changed, the alumina content may be as high as 90%.

This high alumina spinel is very abrasion resistant and in some applications is as good as sintered alpha alumina. In some cases it is superior due to the isotropic nature of the spinel. As more magnesia is used in the mixture, the spinel approaches the theoretical composition and the hardness declines but is still sufficient, when there is no extra alumina, to be highly satisfactory for many applications.

Magnesium spinel is $MgO \cdot Al_2O_3$ and it can be made in the electric furnace. Mullite is $3Al_2O_3 \cdot 2SiO_2$ and can be made in the electric furnace. Stabilized zirconia is zirconia, $ZrO_2$, stabilized with from 3% to 6% of lime CaO or magnesia MgO. The way to synthesize fused stabilized zirconia with from 3% to 6% of lime in solid solution in the zirconia is fully set forth in U. S. Letters Patent No. 2,535,526 granted December 26, 1950, on application of Ballard and Marshall. The correct definition of material described in that patent and including also zirconia stabilized with magnesia or with other oxide is—stabilized zirconia the crystals of which are predominantly cubic. Unstabilized zirconia is monoclinic in crystal habit. Bearing components (including journals) made out of any of magnesium spinel, mullite and stabilized zirconia the crystals of which are predominantly cubic should be made in the manner already explained for making such components out of aluminum oxide.

I have found that zirconium oxide as one member of a bearing gives surprisingly superior results for a reason that I do not understand. Several methods of manufacturing the bearing part may be used. For example, I find it convenient to slip cast zirconia in a plaster mold dry and fire the product at cone 35. In preparing the slip I have ball milled fused stabilized zirconia until the particle size ranges between 1 and 15 microns. However, I also find that I can make satisfactory articles by ball milling and unstabilized zirconia to this particle size along with sufficient calcium carbonate to provide 3 to 5% of calcium oxide in the finished article.

It is also convenient and oftentimes better to make the shapes by cold pressing in a steel mold as was described above for alumina. Here either the ball milled stabilized zirconia or the unstabilized zirconia containing calcium carbonate may be used. For certain purposes it is not necessary when pressure molding to use as fine a particle size as described above but I have made successful bearings with mixtures containing zirconia granules as coarse as 30 mesh mixed with zirconia of graded fineness down to the low micron sizes.

I have also hot molded very superior zirconia products using a graphite mold as in the case of alumina at temperatures ranging from 1400 to 1700° C. Even though the melting point of zirconia is much higher than alumina, it seems to mold even more readily under heat and pressure.

In regard to the degree of stabilization of the zirconia, it is, as far as I am aware, unimportant for bearing purposes except that it is much easier to fabricate strong, crack-free articles from the stabilized product and I therefore prefer to use zirconia at least 50% of which is cubic. By very careful firing, however, I have succeeded in making some unstabilized zirconia articles that are satisfactory for bearing purposes.

It has already been shown that the bearing or journal can be made of a mixture of alumina and mullite in any proportions. These oxides are also compatible with zirconia, stabilized or not, and with spinel, and zirconia and spinel are likewise compatible and can be mixed. Thus mixtures of alumina, mullite, spinel and zirconia can be used, that is mixtures of all four, or any three or any two.

I may make the oxide component out of coarse particles of alumina, spinel, mullite or zirconia or mixtures thereof since, by using different grit sizes, for example 20% No. 14 grit size, 20% No. 20 grit size, 20% No. 60 grit size, 20% No. 120 grit size and 20% No. 300 grit size and finer, it is possible to obtain a body with reasonable strength that shrinks little or not at all on firing which facilitates making articles of accurate dimensions. In order to increase the strength of such bearing components made out of coarse particles as just described I may impregnate them with glass. This can be done by dipping the oxide component into molten glass. The glass, for example, can be made from one part of Kentucky No. 5 ball clay, one part of feldspar and one part of dry sodium silicate.

This glass formed by the fusing of the ball clay, feldspar and sodium silicate is hard oxide material since silicates are oxides. Thus the bearing component essentially consisting of hard oxide material can be only 60% selected from the group consisting of aluminum oxide etc. and the remainder can be glass which was caused to impregnate the component in a second firing. Where the bearing component is a flat member gravity can be relied upon to cause the glass to penetrate. A decision on which of the foregoing compositions should be used depends upon the type of bearing desired, whether or not porosity is important for the retention of oil, how much strength may be desired, etc.

The other component of the journal and bearing according to this invention is, by volume, at least 25% carbide selected from the group consisting of tungsten carbide, titanium carbide, tantalum carbide, zirconium carbide and vanadium carbide and mixtures thereof, the remainder essentially consisting of metal selected from the group consisting of steel, iron, cobalt and nickel and mixtures thereof. While in many cases cobalt is the preferred metal, especially when the content of carbide of the above group is high, I can disperse the carbide or carbides in molten steel or iron. By steel is meant anything that is now understood as steel which includes a small percentage of carbon as cementite and any alloying elements in small proportion such as chromium, vanadium, molybdenum and of course nickel. The iron can be cast iron which contains a small percentage of carbon as graphite, or it can be relatively pure iron known as alpha iron or ferrite.

There are two principal ways of making such pieces. One is by the molding and subsequent sintering of the carbide or mixture or carbides with a small proportion of cobalt or iron (ferrite) or nickel or mixtures of these, all components being powders. The technology of the manufacture of pieces in this manner is now quite well known so I need not describe it further. The other way is to melt the steel, iron, cobalt, nickel or mixture thereof and disperse the carbide or carbides in the form of powder therein. In the cases of vanadium carbide and titanium carbide, I can make a cylinder having an inner surface having 25% by volume or more of the carbide or carbides by centrifugal molding, in accordance with an invention made by my colleague S. S. Kistler. However this need not be described in detail herein since there are other practical ways of making the component having the carbide. This component may be, so far as the defined composition is concerned, only two thousandths of an inch thick integral with a body portion of the same material minus the carbide but in many cases the carbide-containing component will be homogeneous.

In case the journal and bearing is for supporting a rotating shaft and in some cases where a reciprocating cylindrical member reciprocates in an internal cylindrical member the outer piece is preferably aluminum oxide, spinel, mullite or zirconia and the inner piece is preferably carbide as defined. However in cases where the components are for the support of a reciprocating part which is free to move in one direction normal to the reciprocation it makes no difference which is the outer part and which is the inner part. The coefficient of expansion of massive aluminum oxide is about $7.0 \times 10^{-6}$ per degree centigrade. The coefficient of expansion of tungsten carbide is from $5 \times 10^{-6}$ per degree centigrade to $7 \times 10^{-6}$ per degree centigrade. Thus in the case of a journal within a bearing and when the components are aluminum oxide and tungsten carbide with a small amount of metal, by having the aluminum oxide piece on the outside, any heating of the parts causes the outside part to expand more than the inside part thus preventing freezing. In many cases, however, the arrangement can be reversed.

Figure 2:
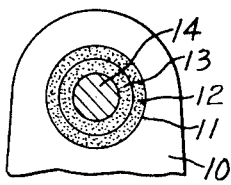
Figure 2 is a vertical sectional view taken on the line 2—2 of Figure 1.

Referring now to Figures 1 and 2, a bearing support 10 has a cylindrical bore 11 into which is either press fitted or shrunk a sleeve 12 made of material selected from the group including aluminum oxide. This sleeve 12 is the bearing and in it runs a sleeve 13 of carbide which is the journal. This sleeve 13 is fitted on the reduced portion 14 of a rotatable shaft 15. At the end of the reduced portion 14 is a shoulder 16 against which the sleeve 13 is held by means of a washer 17 and a nut 18 on a threaded end 19 of the shaft 15.

Figure 3:
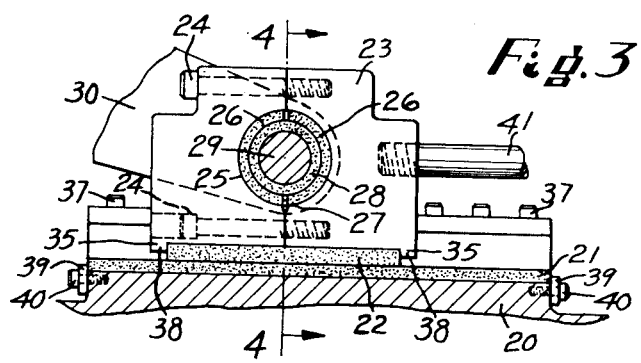
Figure 3 is an elevation of a piston rod guide and slideway therefor (the latter in section) showing a sliding thrust plate attached to the piston rod guide and a slideway supporting plate held by the slideway.
Figure 4:
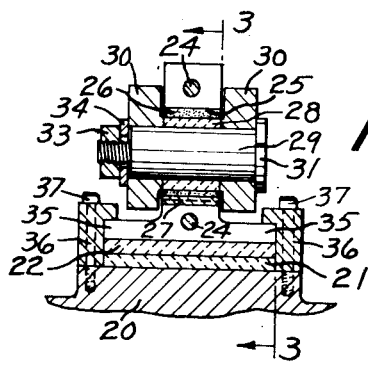
Figure 4 is a vertical sectional view taken on the line 4—4 of Figure 3.

Referring now to Figures 3 and 4, the base of a steam engine or pump has an integral land 20 supporting a slideway supporting plate 21 upon which rests a slide thrust plate 22 of material of the group including aluminum oxide which supports a two part block 23 held together by bolts 24. The block 23 has a cylindrical bore 25 holding two semi-cylindrical sleeve portions 26 of material of the group including aluminum oxide which are held from rotating relative to the block 23 by a gib 27. These two semi-cylindrical sleeve portions of material of the group including aluminum oxide constitute a bearing which supports a journal 28 on a pin 29 passing through the forked end 30 of a connecting rod. The pin 29 has a head 31 at one end and a screw threaded portion at the other end on which is a nut 33 thrusting against a washer 34 which abuts the forked end 30. Thus the journal 28 is tightly secured to the forked end 30 of the connecting rod and the journal 28 is oscillatable within the bearing 26 and in this instance the journal 28 is made of carbide material.

The two part block 23 as best shown in Figure 4 has a wide portion 35 just above the slide thrust plate 22 which is guided by L-shaped slideway guides 36 held onto the land 20 by means of bolts 37. However there is a good sliding clearance between the L-shaped slideway guides 36 and the enlarged portion 35 of the two part block 23. Lug portions 38 overlap the ends of the plate 22 and hold it in position. Similarly lugs 39 secured by bolts 40 to the land 20 hold the slideway supporting plate 21 in position.

If the apparatus of Figures 3 and 4 is a slideway and piston rod guide for the piston rod 41 of a pump, for example an air pump, the crank not shown connected to the connecting rod of which the forked end 30 is shown will rotate clockwise and the resultant thrust on the block 23 will be downward. If, on the other hand, the apparatus is a slideway and piston rod guide for the piston rod 41 of a steam engine, the crank will be rotated counterclockwise and the thrust will still be downward. Thus Figures 3 and 4 show a sliding thrust plate bearing. In such it makes no difference which part is aluminum oxide etc. and which part is carbide.

Figures 3 and 4 also illustrate a journal and bearing for the articulation of parts one of which oscillates relative to the other and they also illustrate the case of a split bearing. The journal and bearing of the invention can be used with superior results for the rotatable or oscillatable support of machine parts where the thrust is radial and also where the thrust is axial.

Figure 5:
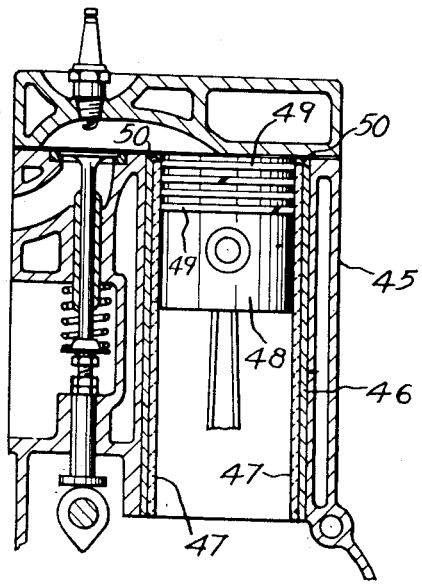
Figure 5 is an axial sectional view of a cylinder showing a piston therein in elevation.

Referring now to Figure 5, the invention has very important advantages when embodied in the cylinder wall and piston rings of internal combustion engines. Figure 5 is a cross section of an automobile engine most of the operating parts of which need not be described since they are clearly shown and are well known. According to the invention the bores of the cylinder block 45 are fitted with steel sleeves 46 having cylindrical liners 47 of material selected from the group consisting of aluminum oxide, magnesium spinel (MgO·Al$_2$O$_3$), mullite and stabilized zirconia. The piston 48 has rings 49 made of carbide selected from the group consisting of tungsten carbide, tantalum carbide, titanium carbide and vanadium carbide and mixtures thereof bonded with metal selected from the group consisting of iron, cobalt and nickel and mixtures thereof, these materials being in proportions previously explained.

Practical rings that are not too brittle can be made from the aforesaid carbide material (including the metal bond). In this case there should be at least 25% by volume of metal bond selected from the aforesaid group in order to make the rings flexible enough so that they will not break on installation.

In accordance with the application of my colleague Samuel S. Kistler, Serial No. 197,278 filed November 24, 1950, the sleeve 46 is in compression against the liner 47 to the extent of at least one hundred pounds per square inch but preferably five hundred pounds per square inch in order that the shock of the explosion will not put any stress on the liner 47. Preferably the steel sleeve 46 has an in-turned flange 50 in engagement with one end of the sleeve 47 and exerting a compressive force against it in an axial direction further to reduce or to eliminate stresses on the liner 47.

The internal surface of the liner 47 should be ground, lapped or honed and the external surfaces of the piston rings should likewise be ground, lapped or honed. Cylinder liners of the aluminum oxide etc. material and piston rings of the carbide material working together will give far greater life than conventional cylinder walls and rings and furthermore will run for quite a while without lubrication. Furthermore these materials are not readily corroded and will be affected neither by hot oil of any kind used in internal combustion engines nor by water nor by the gases of combustion.

For finishing the surfaces that are to be in contact with relatively moving surfaces grinding wheels, particularly diamond grinding wheels, are preferably used. Grinding may be followed with lapping or honing and in this manner beautiful mirror-like surfaces can be produced on the hard materials herein specified. Naturally in the case of journals and bearings the fit should be the best that can be achieved allowing just enough clearance for free rotation and for a film of oil or water. The journal and bearing and also the sliding thrust plate bearing of the invention are preferably lubricated with oil, but so perfect are the surfaces when ground and lapped, so hard are the materials and so immune are they when used together to the effects of seizure that they can run dry under considerable loads and at high speeds for a long time without deterioration. This capability is a great advantage in many situations. For the manufacture of a split bearing such as the semi-cylindrical sleeve portions 26 a full bearing is first made, then ground, then lapped, and finally it is split into two pieces with a diamond cutoff wheel.

Tests were made of the resistance to wear of the materials of this invention and of other materials. In each test a disc four inches in diameter and one-eighth of an inch thick was rotated with its periphery against a flat block, with a speed of rotation of 650 R. P. M. and a load of six pounds, for a total time of two hours and with no lubricant, the test conditions being the same in every case, with the following results as to total wear on both the disc and the block.

Table II

| Disc | Block | Total Wear, Cubic Millimeters |
| --- | --- | --- |
| Aluminum oxide | Tungsten Carbide | 2.60 |
| Boron Carbide | Boron Carbide | 7.00 |
| Hard Steel | Hard Steel | 17.00 |
| Do | Tungsten Carbide | 22.00 |
| Aluminum Oxide | Zirconium Oxide | 36.00 |
| Hard Steel | Bronze | 43.00 |

One advantage of the invention is that both components are refractory as well as hard. Furthermore the components will not deteriorate nor lose their wear resistant properties even if heated to a temperature of 1000° F. Another advantage of this invention is that the oxide material is an electrical insulator which will simplify the design of many machines.

Generically a journal is a bearing, so therefore generically this invention concerns the components of a bearing, one component being aluminum oxide etc. and the other component being tungsten carbide etc. The journal bearing is a specific case. Slideway supporting plates and slide thrust plates are other specific cases since each is a bearing element. The cylinder liner and the piston rings are another case. Each of the elements of the bearing is highly resistant to acids and other corrosives.

The various carbides herein specified, namely tungsten carbide, titanium carbide, tantalum carbide, zirconium carbide and vanadium carbide, have physical properties so closely related that they are equivalents of each other in this invention and furthermore the bonding metals, steel, iron, cobalt and nickel, are so closely related, being metals of the iron group, that it is not material so far as resistance to wear is concerned which one is used or whether a mixture is used. It is quite common to mix several of the above carbides for the manufacture of cutting tools and a mixture of these carbides will wear as well as tungsten carbide when rubbed against aluminum oxide, spinel, mullite or stabilized zirconia. The spinel mentioned as well as mullite and zirconia are all so similar to aluminum oxide in their physical properties that they are equivalent thereto for purposes of this invention and show substantially the same resistance to wear when rubbed against any of the carbides mentioned bonded with any of the metals mentioned. The same is true of mixtures of aluminum oxide, spinel, mullite and stabilized zirconia.

I will now give specific illustrative examples of the manufacture of the components of the invention.

*Example 1*

Air bearings have been known for many years. These are bearings in which the lubricant is a thin film of air instead of a liquid, but they have two serious disadvantages, the load carrying capacity is very small compared to the conventional oil lubricated bearing and during starting and stopping the clean dry surfaces abrade each other and destroy the perfection of the surfaces. It is very important in an air bearing that the surfaces be very clean and geometrically perfect. For many applications the load-carrying capacity is not important and air bearings could become commercially important if bearing materials could be found that could stand the starting and stopping contacts without galling.

I have found that by giving one member of the bearing a carbide surface and making the other member of alumina, mullite, spinel or zirconia, I have been able to achieve this objective and make useful air bearings for high speed drills and the like.

Specifically, a sleeve of mild steel three inches inside diameter and four inches long is turned with an inner flange on each end of one-eighth inch deep so that when it is rotated around its axis, it serves as a centrifugal mold. By spinning this mold at 1200 R. P. M. inside a graphite cylinder that can be closed at both ends except for a hole through which the shaft runs, spreading in the rotating mold a mixture of 80 grams of cemented tungsten carbide scrap containing 4.5% cobalt crushed to pass a 60 mesh screen and 170 grams of cast iron chip screened through a 60 mesh screen, heating the mold in this graphite tube by induction in an atmosphere of hydrogen introduced through a small tube let into the graphite cylinder to a temperature of 1300° C. and cooling, a layer of tungsten carbide particles approximately 2 microns in diameter are laid against the inner wall of the mild steel tube and are covered by the cast iron. The cast iron can be ground away, leaving the very hard cast iron bonded tungsten carbide surface. This surface is ground to an inside diameter of 2.970 inches. A shaft is fitted with a sintered alumina tube cemented to its periphery and the ouside diameter is ground to a diameter of 2.969 inches. If the grinding of the two parts is done carefully, the aluminum oxide cylinder can be inserted into the carbide lined steel cylinder and will rotate freely. When the speed of rotation of one with respect to the other is greater than 100 R. P. M., an air film separates the two and the observed coefficient of friction is extremely small. In fact, the shaft can be set to rotate with the hands and will continue to spin for nearly a minute before the friction slows it down to where the air film is broken and it stops. This bearing is ideal for high speed applications where loads are small.

The other carbides may also be used in this same way except that with vanadium, titanium and zirconium carbide, the carbide will be found just under the inner surface of the cast iron instead of at the interface between the cast iron and the mild steel due to the fact that the specific gravities of these carbides are lower than cast iron. Also, a tube of mullite, spinel or zirconia will serve satisfactorily in place of the sintered alumina.

*Example 2*

A ring seal can be made as follows: A steel ring which is in the shape of a flat washer is turned with a flat broad groove in one side capable of holding, when placed horizontally, a liquid to a depth of about 2 millimeters. For example, the outside diameter of the ring is three inches, the inside diameter is one and three-quarters inches, the thickness is one-quarter of an inch and the ridges that form the broad, narrow groove are one-sixteenth of an inch wide and three thirty-seconds of an inch deep. This is placed horizontally with the groove up and into it is spread a mixture of 3 grams of 200 mesh vanadium carbide and 20 grams of 60 mesh cast iron chips. This ring is heated inductively in an atmosphere of hydrogen to 1250° C. and cooled. The cast iron surface will be found to have a high concentration of vanadium carbide in it. It is ground smooth and flat.

A mating ring of spinel is made three inches outside diameter, two and three-quarters inches inside diameter and one-quarter of an inch thick and cemented to a steel ring to serve as support. The surfaces of both the spinel and the cast iron bonded vanadium carbide may be lapped to a flatness within a few wave lengths of light whereupon they are found to run well against each other as a seal.

Such a seal has been found useful for operating dry to retain gases, for instance, combusted gases conveyed into a rotating ball mill to eliminate the danger of dust explosions when grinding organic material. Also, this seal has been found very useful to retain grease in a bearing and prevent the penetration of water into it when this bearing must be run under water.

*Example 3*

A bearing was desired for the worm drive in a talc mill. No lubrication could be used. A satisfactory solution to the problem has been found by making a bearing similar to that in Example 1 except using a clearance of .004 of an inch. The rate of rotation is slow and therefore heat is not a problem. Any penetration of talc between the bearing surfaces seems to do no harm.

*Example 4*

Sintered alumina, mullite, spinel and zirconia form very superior linings for internal combustion engine cylinders. When such a liner is used, although the rate of wear of the piston rings is less than on a cast iron cylinder wall, it becomes the controlling factor in determining when the engine must be overhauled. Therefore, it is a great advantage to have a piston ring, especially for the top groove, that shows much less wear than the conventional cast iron rings. I have found that by making a centrifugal piston ring mold of fine alumina and clay and casting a mixture of cast iron and tungsten or tantalum carbide in it, such as was used in Example 1, I obtain a piston ring of cast iron with the periphery to a depth of aprpoximately 1 millimeter containing a high percentage of fine tungsten carbide particles. Such a ring, when ground to fit a cylinder, shows much enhanced life over conventional piston rings, partially due to the increased hardness of the surfaces and therefore resistance to abrasion by dust sucked into the engine, and partially by virtue of the peculiar characteristic of these bearing surfaces that when run against each other, even dry, they do not abrade. The cylinder walls at the top of the stroke are poorly lubricated and therefore cast iron or steel rings are excessively worn on this account whereas these carbide rings on the refractory walls show little or no wear.

In a long study of bearing materials suitable for unlubricated bearings, I have investigated large numbers of metallic and non-metallic materials and found that the components hereof provide a very outstanding performance. Practically all materials, whether metallic or non-metallic, when run against themselves as bearings without lubrication tend to wear rapidly, and present theory indicates that the reason is due to the similar chemical nature of the two surfaces and the ease with which they can weld together or adhere. Sub-microscopic points adhering tend to pull particles from one or the other surface and produce what is called galling or scuffing. These loosened particles between the two surfaces cause further damage.

The dissimilarity between the two mating surfaces of this invention is extreme. Each of the carbides listed has a very high melting point and a very high chemical stability. This statement also applies to each of the ceramic bodies. Therefore, I visualize that at least part of the superior performance is due to the very high temperature that must be attained between the two surfaces before any melting can occur and the very high chemical stability of each material tending to inhibit any chemical reaction even at temperatures approaching the melting point. It is possible, however, that my explanation of the performance of these bearings is incomplete or even in error so that my invention is not based upon this explanation.

It will thus be seen that there has been provided by this invention a bearing in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. A running bearing consisting of two components in contact with each other, one of said components essentially consisting of hard oxide material of which at least 60% by volume is selected from the group consisting of aluminum oxide, spinel ($MgO \cdot Al_2O_3$), mullite ($3Al_2O_3 \cdot 2SiO_2$) and zirconia and mixtures thereof, and the other of said components, for at least two thousandths of an inch in depth where said components are in contact being at least 25% by volume carbide selected from the group consisting of tungsten carbide, tantalum carbide, titanium carbide, zirconium carbide and vanadium carbide and mixtures thereof, the remainder of said other component essentially consisting of metal selected from the group consisting of steel, iron, cobalt and nickel and mixtures thereof, each of said components having a smooth surface where it contacts the other one.

2. A cylinder liner and a piston ring, said cylinder liner being a hollow cylindrical member having a smooth surface on the inside essentially consisting of hard oxide material of which at least 60% by volume is selected from the group consisting of aluminum oxide, spinel ($MgO \cdot Al_2O_3$), mullite ($3Al_2O_3 \cdot 2SiO_2$) and zirconia and mixtures thereof, and the piston ring for at least two thousandths of an inch in depth on its periphery being at least 25% by volume carbide selected from the group consisting of tungsten carbide, tantalum carbide, titanium carbide, zirconium carbide and vanadium carbide and mixtures thereof, the remainder of said piston ring essentially consisting of metal selected from the group consisting of steel, iron, cobalt and nickel and mixtures thereof, said piston ring having a smooth outer surface.

3. A running bearing according to claim 1 in which one component is a journal and is the inner component and is made of carbide and metal as defined in claim 1.

4. A running bearing according to claim 3 in which one component is made of aluminum oxide.

5. A running bearing according to claim 1 in which one component is made of aluminum oxide.

6. A cylinder liner and piston ring according to claim 2 in which the cylinder liner is made of aluminum oxide.

References Cited in the file of this patent

UNITED STATES PATENTS

| Number | Name | Date |
|---|---|---|
| 1,600,961 | Payne | Sept. 21, 1926 |
| 1,661,448 | Taylor | Mar. 6, 1928 |
| 2,253,969 | Dawihl et al. | Aug. 26, 1941 |
| 2,426,940 | McCullough | Sept. 2, 1947 |
| 2,602,714 | Wheildon, Jr. | July 8, 1952 |